(12) United States Patent
Zewail et al.

(10) Patent No.: US 10,122,905 B2
(45) Date of Patent: Nov. 6, 2018

(54) METHOD AND APPARATUS FOR CAPTURING AND SHARING DIGITAL CONTENT ON A COMPUTING DEVICE

(71) Applicant: Begether, Inc., Cairo (EG)

(72) Inventors: Ali Mohamed Zewail, Alexandria (EG); Mohamed Nar, New Cairo (EG)

(73) Assignee: Begether, Inc., Cairo (EG)

( * ) Notice: Subject to any disclaimer, the term of this patent is extended or adjusted under 35 U.S.C. 154(b) by 0 days.

(21) Appl. No.: 15/278,903

(22) Filed: Sep. 28, 2016

(65) Prior Publication Data
US 2018/0091724 A1 Mar. 29, 2018

(51) Int. Cl.
*H04N 5/232* (2006.01)
*H04N 1/00* (2006.01)

(52) U.S. Cl.
CPC ..... *H04N 5/23203* (2013.01); *H04N 1/00244* (2013.01); *H04N 1/00381* (2013.01); *H04N 1/00403* (2013.01); *H04N 5/23216* (2013.01); *H04N 2201/0084* (2013.01)

(58) Field of Classification Search
CPC .......... G02B 27/017; G02B 2027/0178; G02B 2027/0118; G02B 27/0093; G02B 27/0172; G02B 2027/0127; G02B 2027/0123; G02B 2027/0138; G02B 23/125; G06F 1/163; G06F 3/013; G06F 3/011; G06F 3/005
See application file for complete search history.

(56) References Cited

U.S. PATENT DOCUMENTS

| | | | |
|---|---|---|---|
| 6,549,231 B1* | 4/2003 | Matsui | H04N 7/183 348/151 |
| 2015/0244903 A1* | 8/2015 | Adams | G02B 27/017 348/376 |
| 2016/0089042 A1* | 3/2016 | Saponas | A61B 5/02438 600/437 |
| 2017/0351098 A1* | 12/2017 | Osterhout | G02B 27/0176 |

* cited by examiner

*Primary Examiner* — Trung Diep
(74) *Attorney, Agent, or Firm* — DLA Piper LLP (US)

(57) ABSTRACT

The invention provides an improved method and apparatus for capturing and sharing digital content, such as image, video, audio, or textual content, quickly and with minimal user activity compared to the prior art. In one embodiment, a computing device performs an action when it is placed in a substantially vertical orientation. In another embodiment, the computing device performs another action in response to movement of the computing device. Other embodiments are disclosed herein.

24 Claims, 14 Drawing Sheets

METHOD AND APPARATUS FOR CAPTURING AND SHARING DIGITAL CONTENT ON A COMPUTING DEVICE

TECHNICAL FIELD

The invention provides an improved method and apparatus for the simplification and speeding up of the process that covers activating a capture mode for creating digital content (such as image, video, audio, or textual content) and subsequently capturing and then sharing that digital content with minimal user activity compared to the prior art.

BACKGROUND OF THE INVENTION

With the continuous availability of devices capable of capturing moments as they happen, users of such devices are constantly making spontaneous records of fleeting moments. These devices include mobile phones, smart glasses, digital cameras and many other devices. These devices are there at the right moment, encouraging people to use them to record their perspectives during these moments. Moreover, people use currently available networks and devices to share these recorded moments to their different social networks. This is done in a manner specific to each network.

As such, these two actions (recording the moment and sharing it) are repeatedly done by millions of people on a daily basis. In the prior art, these actions are done in a manner that is inefficient and often cumbersome for the user. Users of the prior art need to perform several steps in order to bring to fruition a shared spontaneous record of a moment. These steps include and are not limited to activation of the device that will make this record, activation of the mode that will allow the recording, confirmation of this recording, choice of a sharing method or a saving method or both, and the actual sharing action.

The prior art is inefficient in many ways. The prior art slows down the spontaneous action potentially rendering it meaningless due to untimeliness. The prior art is slower than optimal and thus doesn't allow repetitive applications of the series of actions when the moment requires this. In the prior art, the difficulty of sharing this record with others immediately makes it less likely that people will ever do so, hence reducing social sharing. In the prior art, the difficulty of recording and sharing also makes it likely that people will postpone the action thus decreasing the likelihood that the action will ever be taken. The prior art also interferes more deeply with the action at hand, since it requires significant attention, increasing the chance of spoiling the social or spontaneous aspect of the recorded moment.

The present invention relates to increasing the efficiency of the prior art by solving the different inefficiencies mentioned above.

SUMMARY OF THE INVENTION

Embodiments of the invention enable people to record and share moments easily and quickly through their computing devices, including but not limited to mobile phones, tablets, smart glasses, smart watches and personal computers.

These recordings can vary in type from public to personal. Moreover, recordings can be made in situations that vary in size from large work or social events to situations as small as passing by a scene worth recording and sharing from the user's point of view.

The inventive device can use different methods to infer that the user would like to record a moment (detailed examples of these methods in the detailed description section). Having recognized this, embodiments of this invention facilitate the recording and subsequent sharing of this record with minimal effort and time.

In other words, the methods of the invention include ways to infer, using different mechanisms, the user's intention to record and share a moment. After that, methods of the invention also include automatically performing all steps needed to make it possible for the user to perform a one-step capture and sharing of media to one or more desired sharing channels after the detection of her/his intention. Examples of these steps are activating capturing device, set capturing mode, set sharing mode, connect to the sharing channels' media streams and any other device specific steps needed.

The features and advantages described in this summary and the following detailed description are not all-inclusive. Many additional features and advantages will be apparent to one of ordinary skill in the art in view of the drawings and specifications.

DETAILED DESCRIPTION OF THE PREFERRED EMBODIMENTS

Capturing and sharing fleeting moments, as they happen, has become an increasing need for people now with the increasing and continuous availability of different types of media devices capable of producing these recordings and access to different sharing channels to share such recordings.

Such continuous availability encourages users to fulfil this rising need that is developing with the availability of new technological and social trends. Users not only need to be able to perform these actions quickly and easily (capturing and sharing) but also to be able to repeat them with any desired frequency without negatively affecting the quickness and easiness of the actions.

The invention provides a mechanism to make it easy and quick for the user, using the same available devices and sharing channels, to capture and share any moments and repeat these actions without slowing down or hindering the user.

Figure 7:
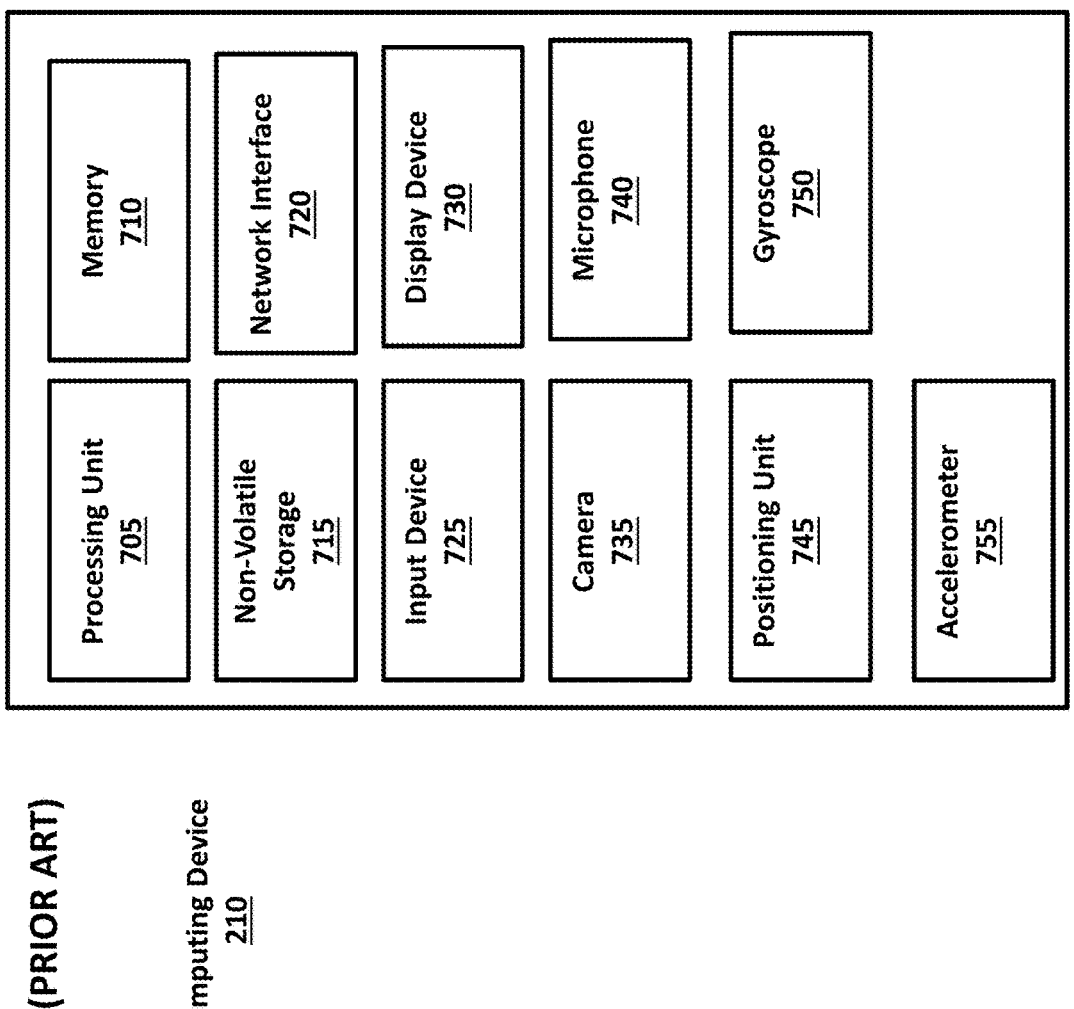
FIG. 7 illustrates exemplary hardware components of a computing device.

With reference to FIG. 7, exemplary computing device 210 is depicted. Computing device 210 can be a mobile device, server, desktop, notebook, intelligent glasses, digital camera, tablet, or any other computer with the ability to capture digital content. Computing device 210 comprises exemplary hardware components such as processing unit 705, memory 710, non-volatile storage 715, network interface 720, input device 725, display device 730, camera 735, microphone 740, positioning unit 745, gyroscope 750, and accelerometer 755.

Non-volatile storage 715 can comprise a hard disk drive, solid state drive, biological storage, nanostructure storage, MEMS-based storage, or any other types of known storage. Network interface 720 can comprise an interface for wired communication (e.g., Ethernet) or wireless communication (e.g., 3G, 4G, GSM, 802.11). Input device 725 can comprise a keyboard, mouse, touchscreen, microphone, motion sensor, virtual reality device, Oculus device, laser-scanning device, and/or other input device. Display device 730 can comprise an LCD screen, touchscreen, or other display. Positioning unit 745 can comprise a GPS unit. Gyroscope 750 comprises a device that can sense orientation in three-dimensional space. Accelerometer 755 comprises a device that can sense acceleration in three-dimensional space. The hardware components of computing device 210 are known in the prior art.

Figure 8:
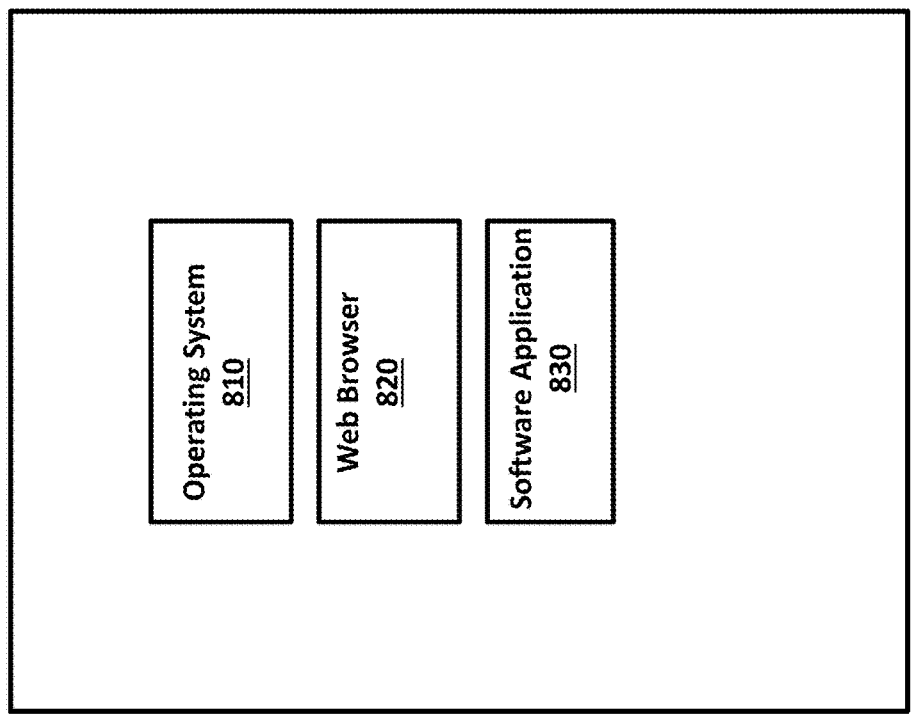
FIG. 8 illustrates exemplary software components of a computing device.

With reference to FIG. 8, exemplary software components of computing device 210 are depicted. Computing device 210 comprises operating system 810 (such as Windows, Linux, MacOS, Android, or iOS), web browser 820 (such as Internet Explorer, Chrome, Firefox, and Safari), and software application 830. Operating system 810, web browser 820, and software application 830 each comprise lines of software code that can be stored in memory 710 and executed by processing unit 705.

Figure 9:
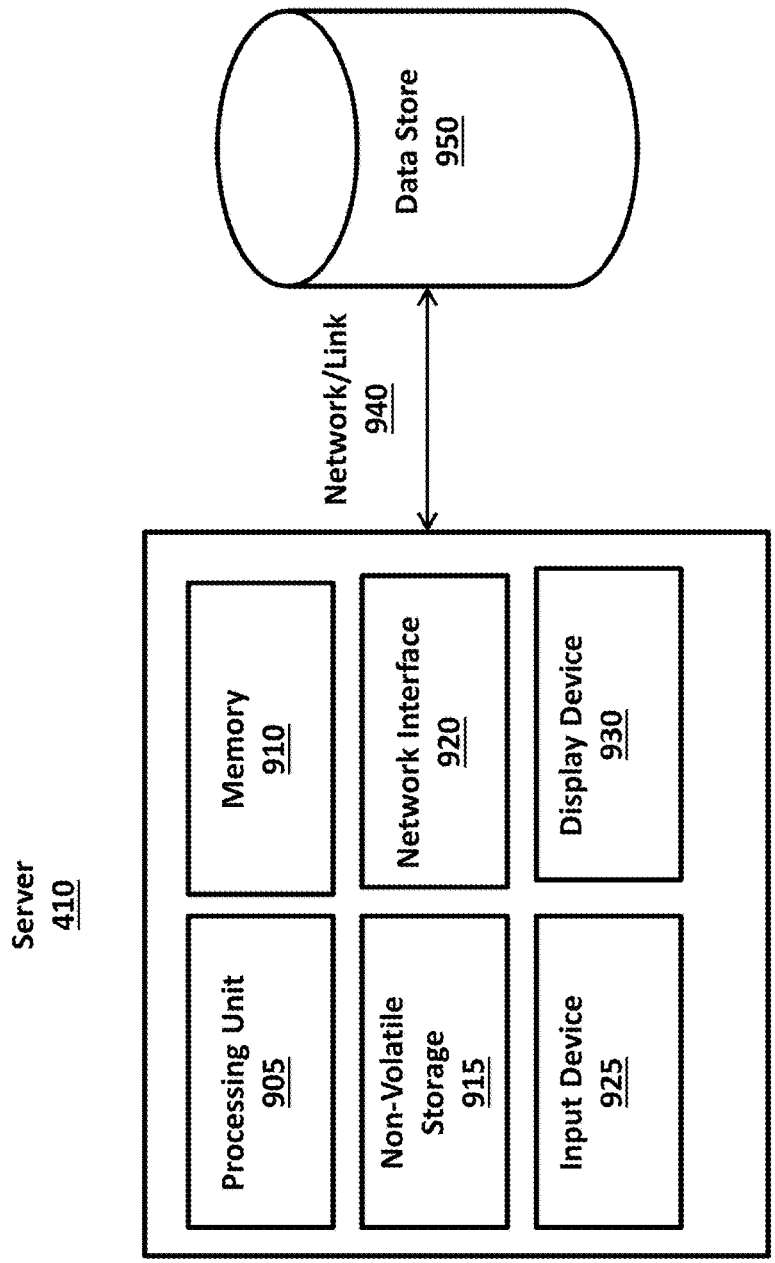
FIG. 9 illustrates exemplary hardware components of a server.

With reference to FIG. 9, exemplary hardware components of server 410 are depicted. Server 410 comprises processing unit 905, memory 910, non-volatile storage 915, network interface 920, input device 925, and display device 930. Non-volatile storage 915 can comprise a hard disk drive or solid state drive. Network interface 920 can comprise an interface for wired communication (e.g., Ethernet) or wireless communication (e.g., 3G, 4G, GSM, 802.11). Input device 925 can comprise a keyboard, mouse, touchscreen, microphone, motion sensor, and/or other input device. Display device 930 can comprise an LCD screen, touchscreen, or other display.

Server 410 is coupled through network interface 920 to data store 950 over network/link 940. Network/link 940 can comprise wired portions (e.g., Ethernet or an internal or external bus) and/or wireless portions (e.g., 3G, 4G, GSM, 802.11), or a link such as USB, Firewire, PCI, etc. Network/link 190 can comprise the Internet, a local area network (LAN), a wide area network (WAN), or other network. Hardware components of server 410 are known in the prior art.

Figure 10:
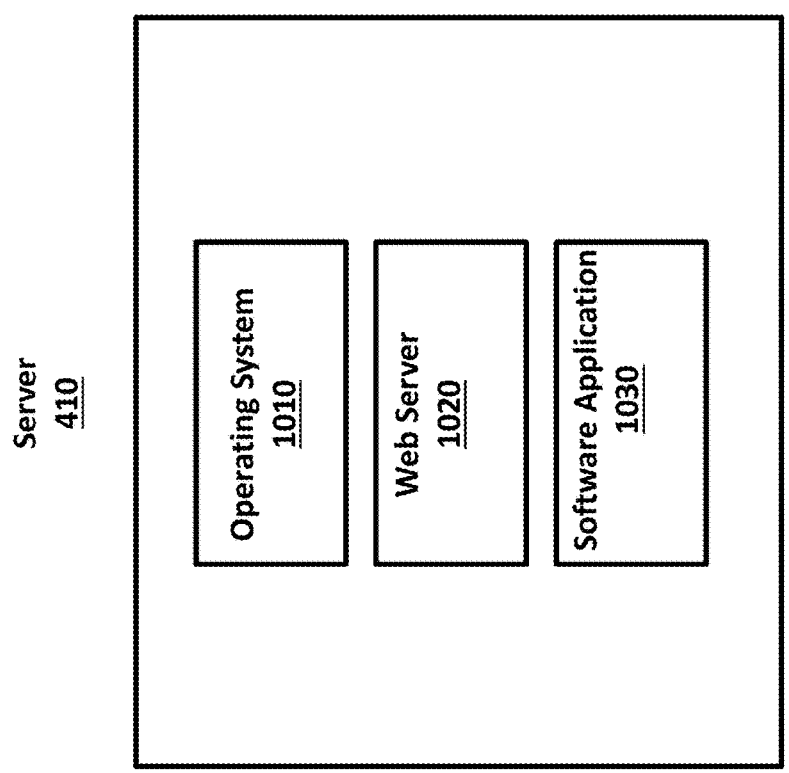
FIG. 10 illustrates exemplary software components of a server.

With reference to FIG. 10, exemplary software components of server 410 are depicted. Server 410 comprises operating system 1010 (such as Windows, Linux, MacOS, Android, or iOS), web server 1020 (such as Apache), and software application 1030. Operating system 1010, web server 1020, and software application 1030 each comprise lines of software code that can be stored in memory 910 and executed by processing unit 905. Some embodiments described below are implemented by software application 1030.

Figure 11:
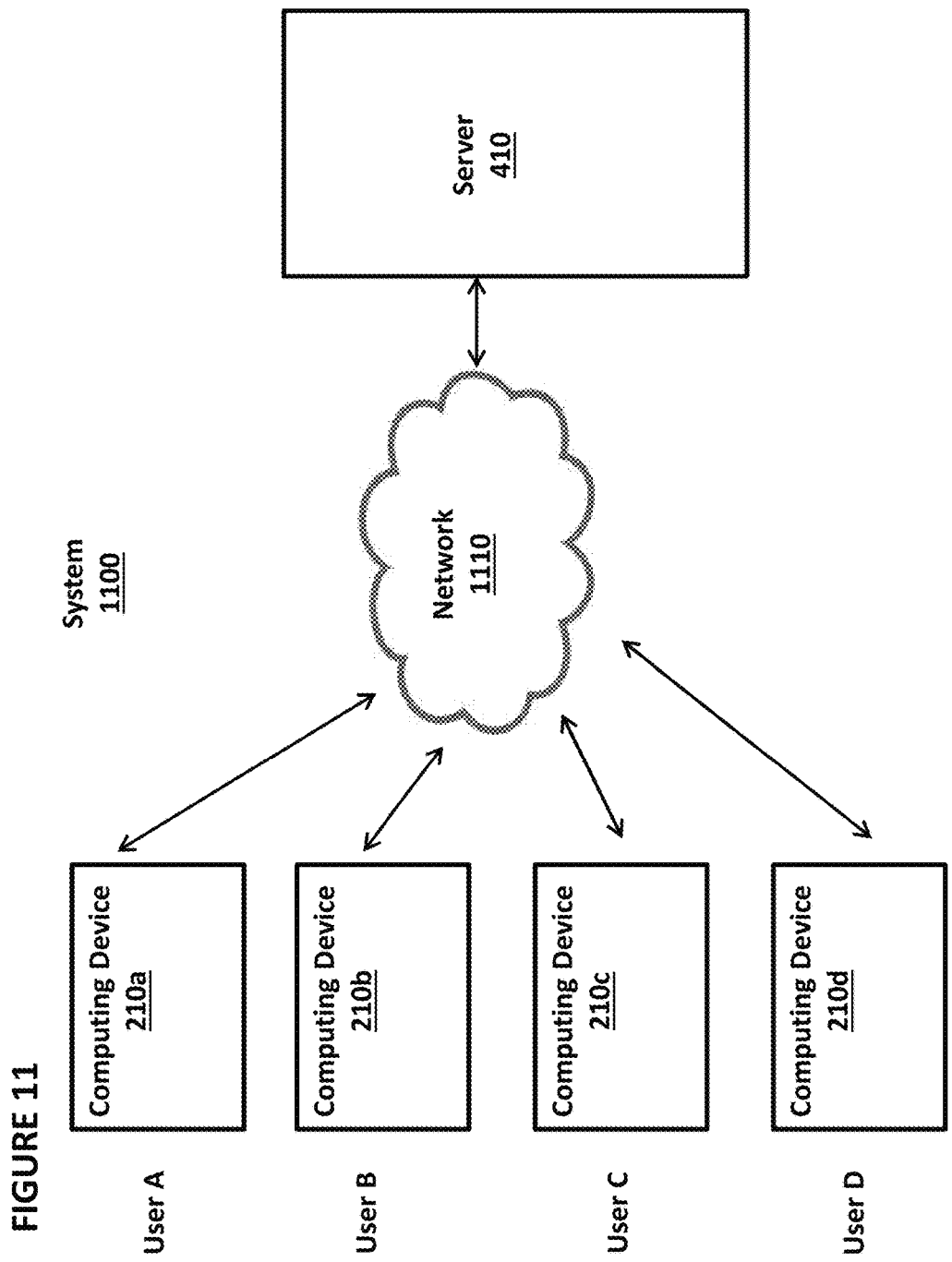
FIG. 11 illustrates a system comprising a server and numerous computing devices communicating over a network.

With reference to FIG. 11, system 1100 is depicted. System 1100 comprises exemplary computing devices 210a, 210b, 210c, and 210d communicating with exemplary server 410 over network 1110. Computing devices 210a, 210b, 210c, and 210d are each based on the design of computing device 210, described previously with reference to FIGS. 7 and 8. In this example, computing devices 210a, 210b, 210c, and 210d are operated by Users A, B, C, and D, respectively.

Network 1110 can comprise wired portions (e.g., Ethernet) and/or wireless portions (e.g., 3G, 4G, GSM, 802.11), or a link such as USB, Firewire, PCI, etc. Network 1110 can comprise the Internet, a local area network (LAN), a wide area network (WAN), or other network.

Figure 1:
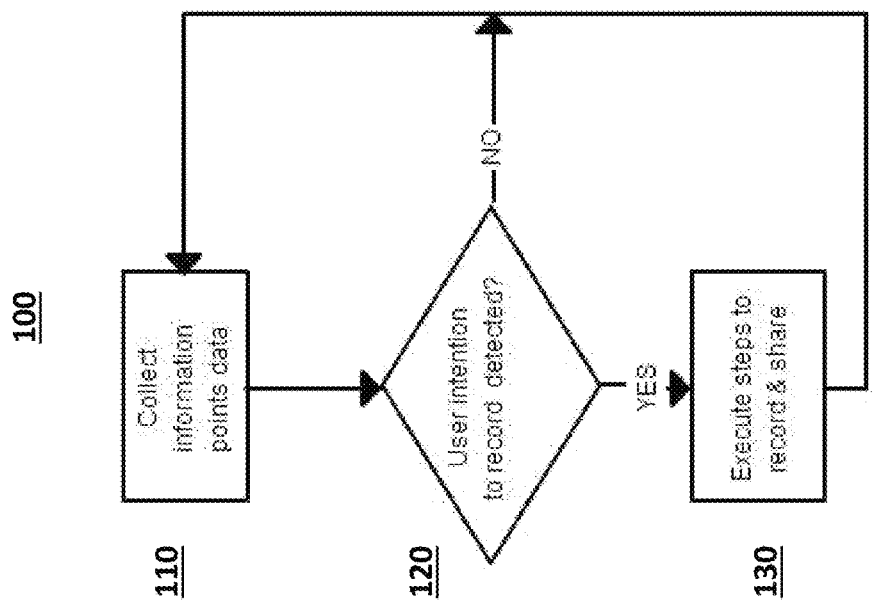
FIG. 1 is a flowchart illustrating the main conceptual steps of the method of the invention.

FIG. 1 illustrates the main conceptual steps of the method of the invention, which are implemented by system 1100 or a portion thereof. The objectives of these steps are:

- To intuitively detect that the user has the intention of capturing a moment, optionally without requiring the user to press a button on a screen or a physical button.
- To enable the user of a "capturing capable device" to capture moments in the minimal number of steps-once capturing intention has been detected.
- To enable captured moments to be shared easily, with the minimal number of steps.
- To facilitate the repetition of this combined action as many times as needed.

As can be seen, these steps avoid spoiling the spontaneity of social happenings by minimizing the time of technological interruptions, thus avoiding the spoiling of the spontaneity of media capture and sharing.

The process described in FIG. 1 is active whenever the invention is enabled. The device continuously collects information points related to computing device 210 (step 110). Information points are one or a combination of data values coming from different sources. Examples of these sources are gyroscope 750, accelerometer 755, positioning unit 745, and the user's input and preset information/settings on computing device 210. When computing device 210 infers from information points that the user would like to capture a moment, computing device 210 is automatically set up to enable capturing and sharing the moment, optionally without the user pressing a button on the screen or a physical button (step 120). Once the moment is captured and/or shared (step 130), computing device 210 goes back to collecting information points in order to infer the user's intent. By doing this, computing device 210 can enable the user to quickly and efficiently repeat the capturing and sharing action as needed.

During step 110, computing device 210 continuously reads different information points (examples outlined above) and processes them to infer that the user has the intent to capture media. During step 120, computing device 210 (through software application 830) uses the information points to infer whether or not the user is ready to capture the moment, optionally without the user pressing a button on the screen or a physical button. Once this inference is made, in the third step, the invention proceeds and sets up the media capture and share mode. This inference can take place in different ways, all of which are covered in the method of this invention. The following descriptions of some of these ways do not make the methods of this invention exclusive to any of these ways. Once the capture is made, the invention returns the device to the first step.

Figure 2:
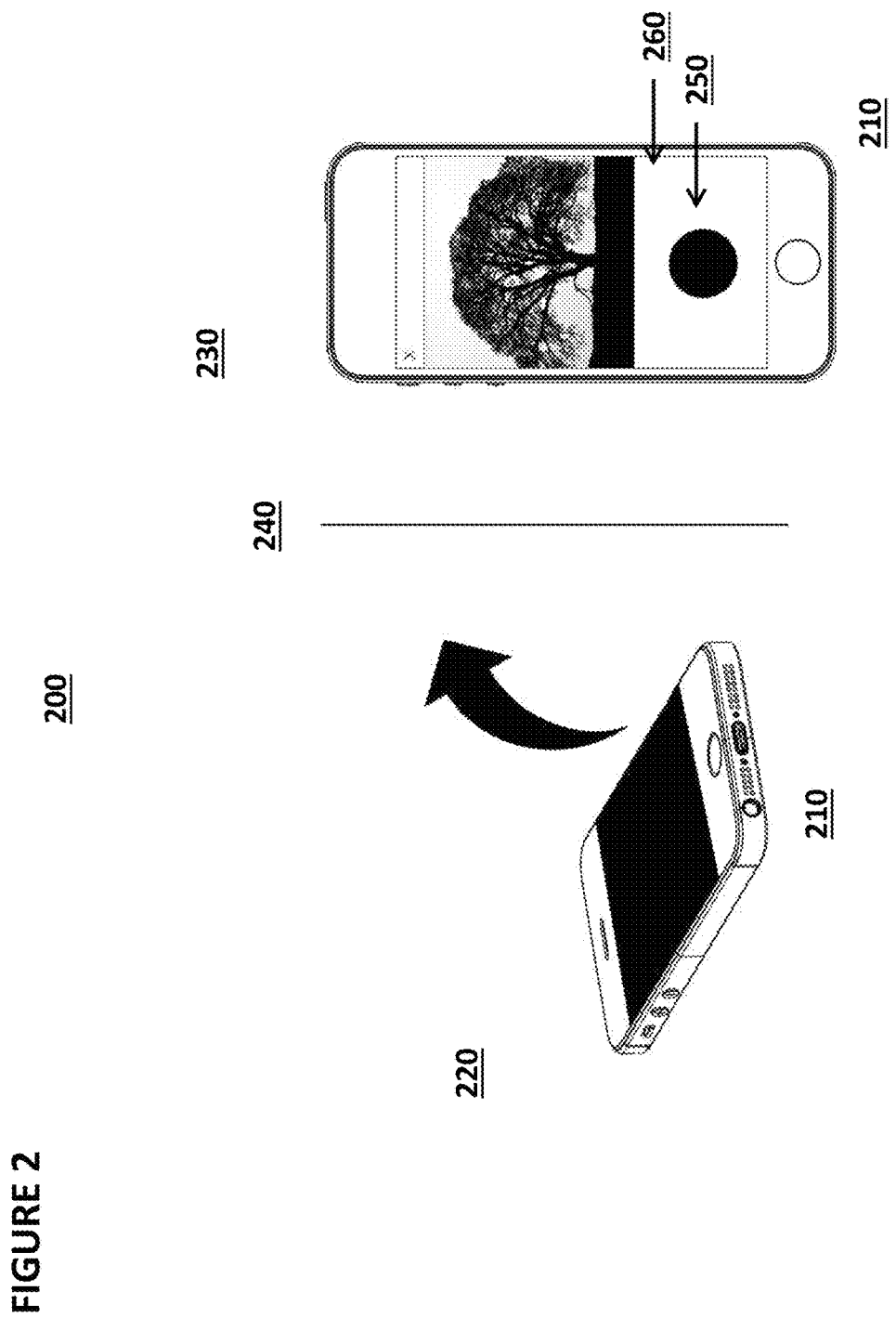
FIG. 2 illustrates an embodiment of the invention that uses the device's gyroscope sensor readings as information points to infer the user's intention to capture a moment.

As mentioned above, information points are one or a combination of data values coming from different sources. In an embodiment of the invention, it could simply be data generated by gyroscope 750, which will detect a certain change in the orientation of computing device 210. So the methods of this embodiment continuously checks the readings of the gyroscope 750 about the change of orientation of computing device 210 and the speed in which this change took place. Based on this continuous monitoring, computing device 210 infers the user's intention to capture a moment. In the preferred embodiment, this intention is inferred based on a single action by the user, such as changing the orientation of computing device 210 to the position normally used to take a photo (e.g., substantially vertical position). As such, when a certain condition of the orientation change and/or speed of change is true, the method of the invention can deduce that the user intention to capture a moment. An example of how this would be manifested to the user is illustrated in FIG. 2, such change of orientation is used to infer this intention and hence enable the methods of the invention to perform the third step in the flowchart illustrated in FIG. 1. Optionally, the user's intent can be inferred without the user pressing a button on the screen or a physical button. Optionally, the inference can be made only after the passage of a certain amount of time. For example, if computing device 210 is held in a substantially vertical position for X seconds, then an inference can be made that the user wishes to take a photo. An example of X might be one or two seconds.

With reference to FIG. 2, a method 200 of capturing an event using the steps of method 100 is depicted. Computing device 210 begins in a non-vertical position, in which it is idle and the screen is inactive mode (step 220). The user then moves computing device 210 into a substantially vertical position (230), which is determined with reference to the earth's surface (illustrated by a theoretical line 240 perpendicular to the earth's surface). Computing device 210 senses this movement and change in orientation and infers that the user wishes to capture digital content using camera 735 or through other means. Computing device 210 enables and generates user interface 260, which comprises input device 250. In this example, the user simply presses input device 250 to take a photograph or to begin a video capture. This literally turns the process into a point-and-click experience for the user, whereas in the prior art multiple taps, selections, and user interface maneuvers would be required.

Before going into the details of the third step for FIG. 1, let us explore another possible embodiment of the invention where the "Information Points" can include another dimension. The purpose of this exploration is to show the endless ways and embodiments that can be implemented to perform the information points check.

Figure 12:
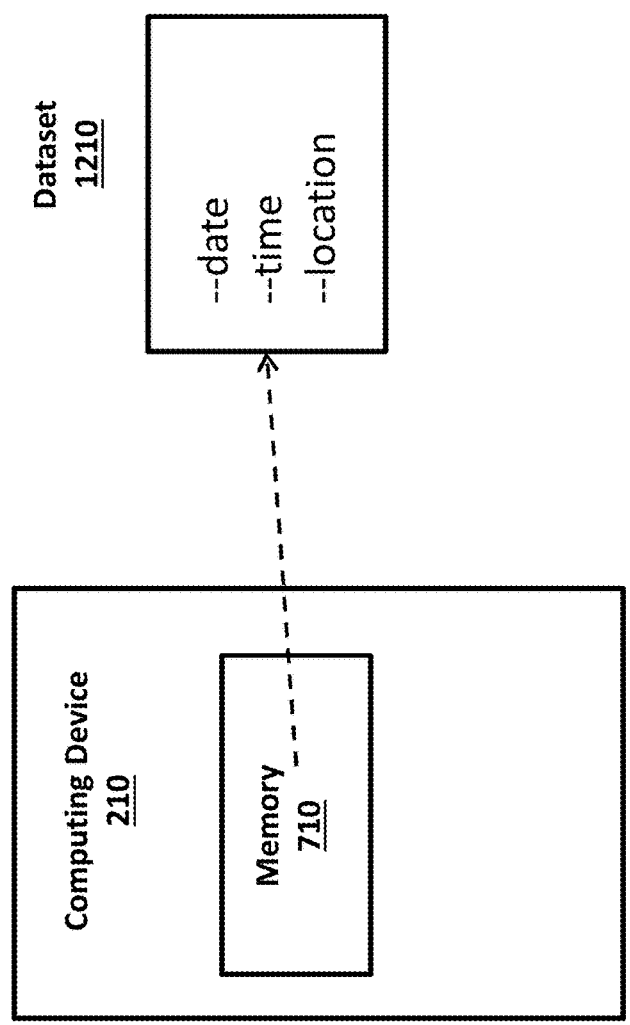
FIG. 12 illustrates the use of a dataset by a computing device.

In another embodiment of the invention, with reference to FIG. 12, information points could include checking data set 1210, which can comprise the date, time and user's location stored in memory 710, in addition to the gyroscope data. This could take place to check if the date, time and location matches a happening that the user previously stated that she/he will attend and intends to capture media during. When the user states she/he will attend a happening, embodiments of the invention store the happening data (date, time and location) to be used as part of the information points.

In another example, an embodiment of the invention can detect the user's intention to capture a moment through a direct, yet easy order from the user through a simple, pre-defined touchscreen gesture or voice command. Hence triggering the first step of FIG. 1 and proceeding with the process.

Figure 3:
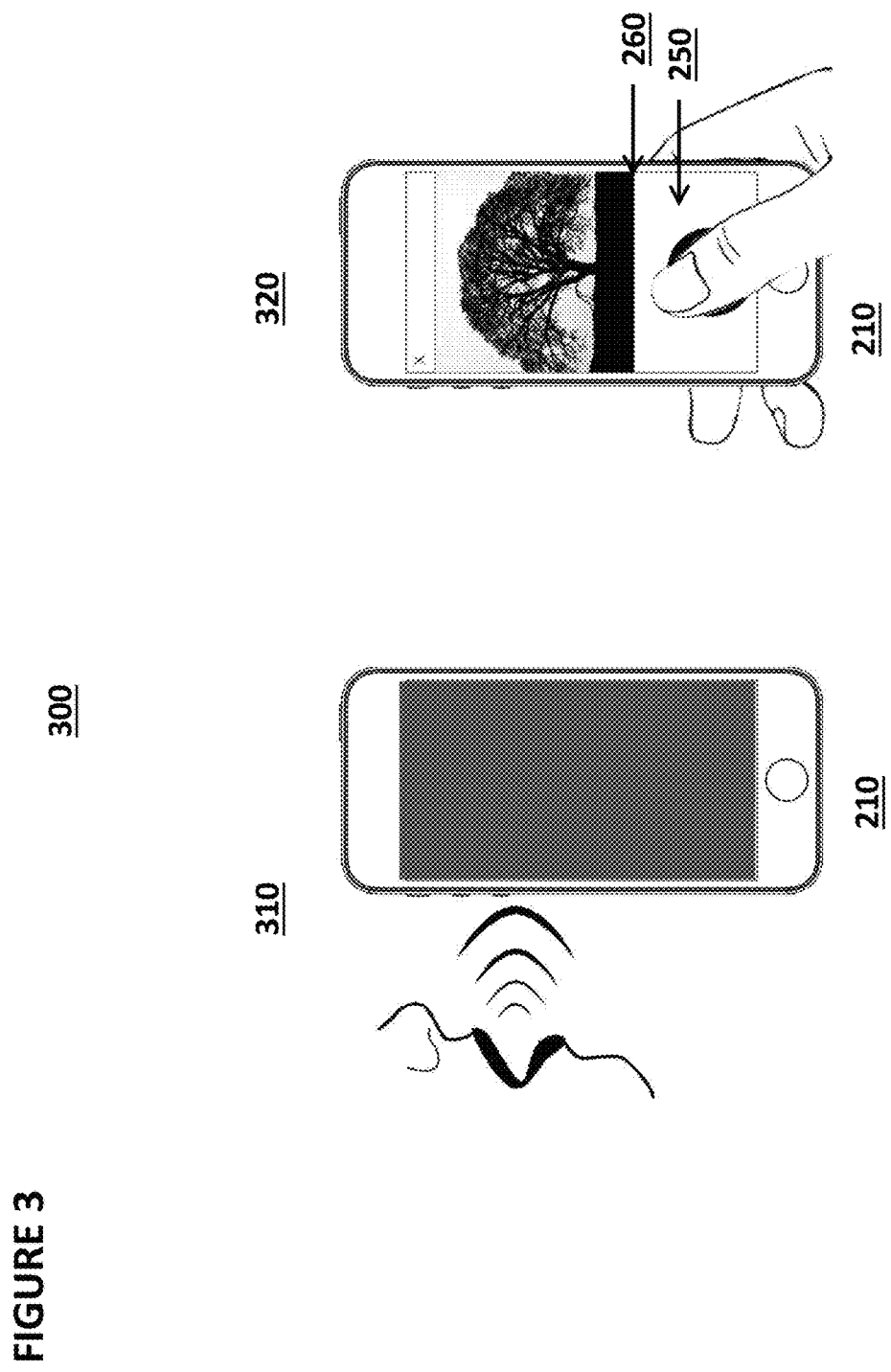
FIG. 3 illustrates an embodiment of the invention that uses a voice command from the user to detect the capture intention.

Referring to the previous example, and as shown in FIG. 3, an embodiment 300 of the invention is depicted. Here, a user gives a voice command to computing device 210 (step 310). For example, the user might say "camera" or "photo." Microphone 740 detects the voice command, and software application 830 responds to the voice command by initiating user interface 260, which comprises user interface 260 as in FIG. 3. Again, the user's intention can be inferred based on a single action by the user (e.g., uttering "camera" or "photo"), optionally without the user pressing a button on the screen or a physical button. In this example, the user simply presses input device 250 to take a photograph or to begin a video capture. This literally turns the process into a speak-and-click experience for the user, whereas in the prior art multiple taps, selections, and user interface maneuvers would be required.

Once the capturing occurs through any of these mechanisms, as part of the third step of FIG. 1, computing device 210 can share the recorded digital content through different sharing channels with minimal effort and time. In the preferred embodiment, the sharing step can occur in response to a single action by the user (e.g., a swipe).

An embodiment of the invention could include opening a specific capturing and sharing application (an embodiment of software application 830) that automatically enables the user to use one click to capture and share media to one or more sharing channels. These sharing channels can be predetermined by multiple possible ways. One of them could be that the application gets a happening's specific sharing channel settings. Another way is to give the user the opportunity to select the desired sharing channel for this specific type of capture.

Another embodiment of the invention could include opening the standard device's operating system capture mechanism then after recording is done, the recording is shared through a default-sharing channel set by the device operating system or by the user.

Once this is completed, the device automatically and quickly gets back to the point of being ready to infer the desire of the device's user to capture a moment, to enable any need for quick repeat of the action. In other embodiments of the invention, and as desired by the user, this returning back can be done manually by the user to give her/him the opportunity to perform any required extra steps on the shared media, like tagging or commenting on it.

Figure 4:
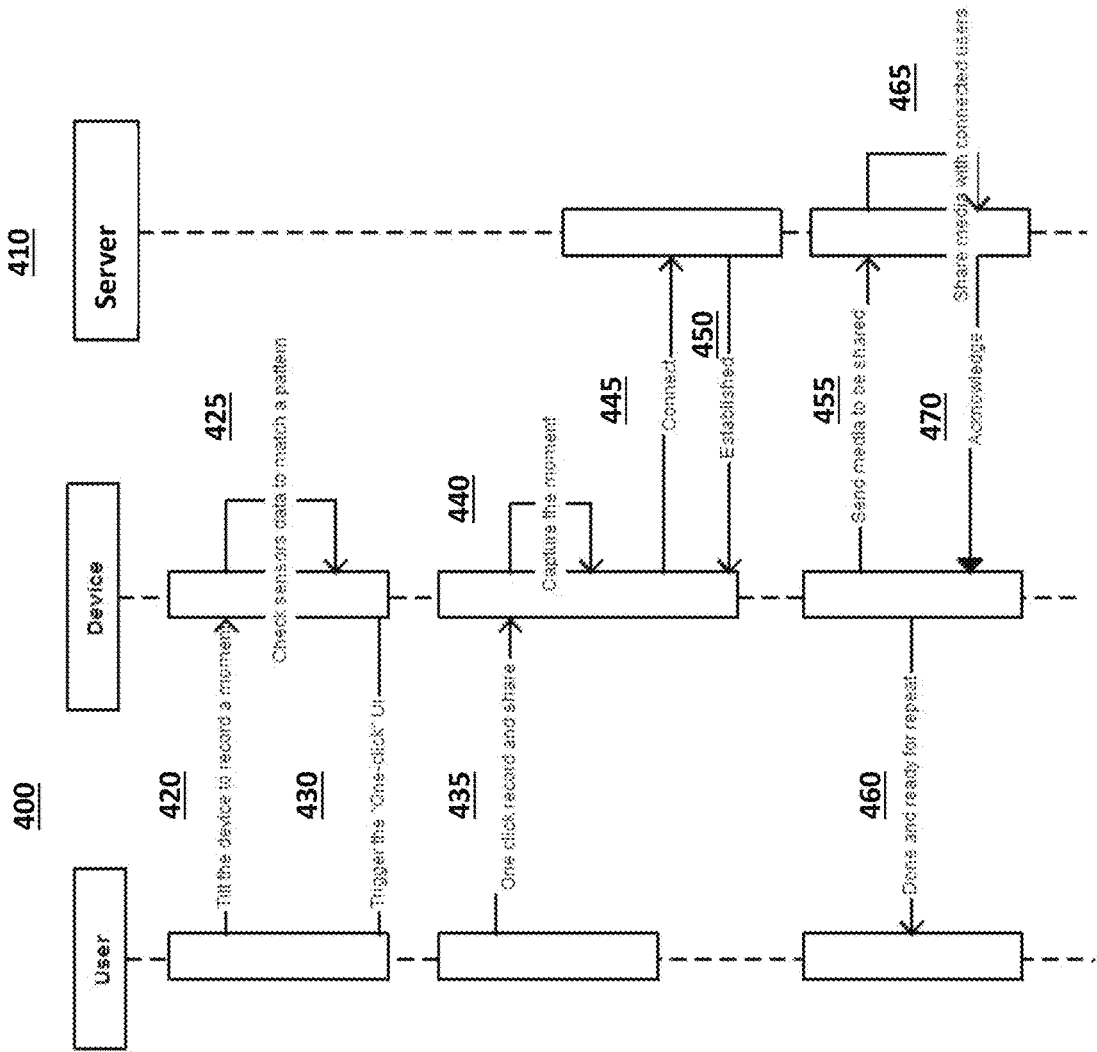
FIG. 4 is a sequence diagram illustrating a sample embodiment of the invention, describing the interactions between components of a sample set of systems performing a sample specific implementation to the conceptual steps of the method of the invention.

The main inventive steps are implemented mainly on the device facilitating the user to capture and connect to the sharing channel(s). A sample process of ordered interactions is illustrated in FIG. 4 where the user makes changes to some information points collected continuously by the device, the device infers from the changes that the user desires to capture a recording of the current moment. Hence, the device introduces some sort of interface to the user enabling her/him to capture and share this moment in one manipulation. The device records this moment and connects to sharing channel to share this recording.

Specifically, the user tilts computing device 210 to record a moment (step 420). Computing device 210 continually checks its hardware components to determine if certain actions have occurred (step 425). Computing device 210 triggers user interface 260 (step 430) for the user. The user then initiates recording or recording and sharing (step 435). Computing device 210 captures the digital content (step 440). Computing device 210 connects with server 410 (step 445). Server 410 acknowledges the connection (step 450). Computing device 210 then shares the digital content with server 410 (step 455). Server 410 then shares digital content with connected users (step 465). Server 410 acknowledges that the sharing has occurred (step 470).

Figure 5:
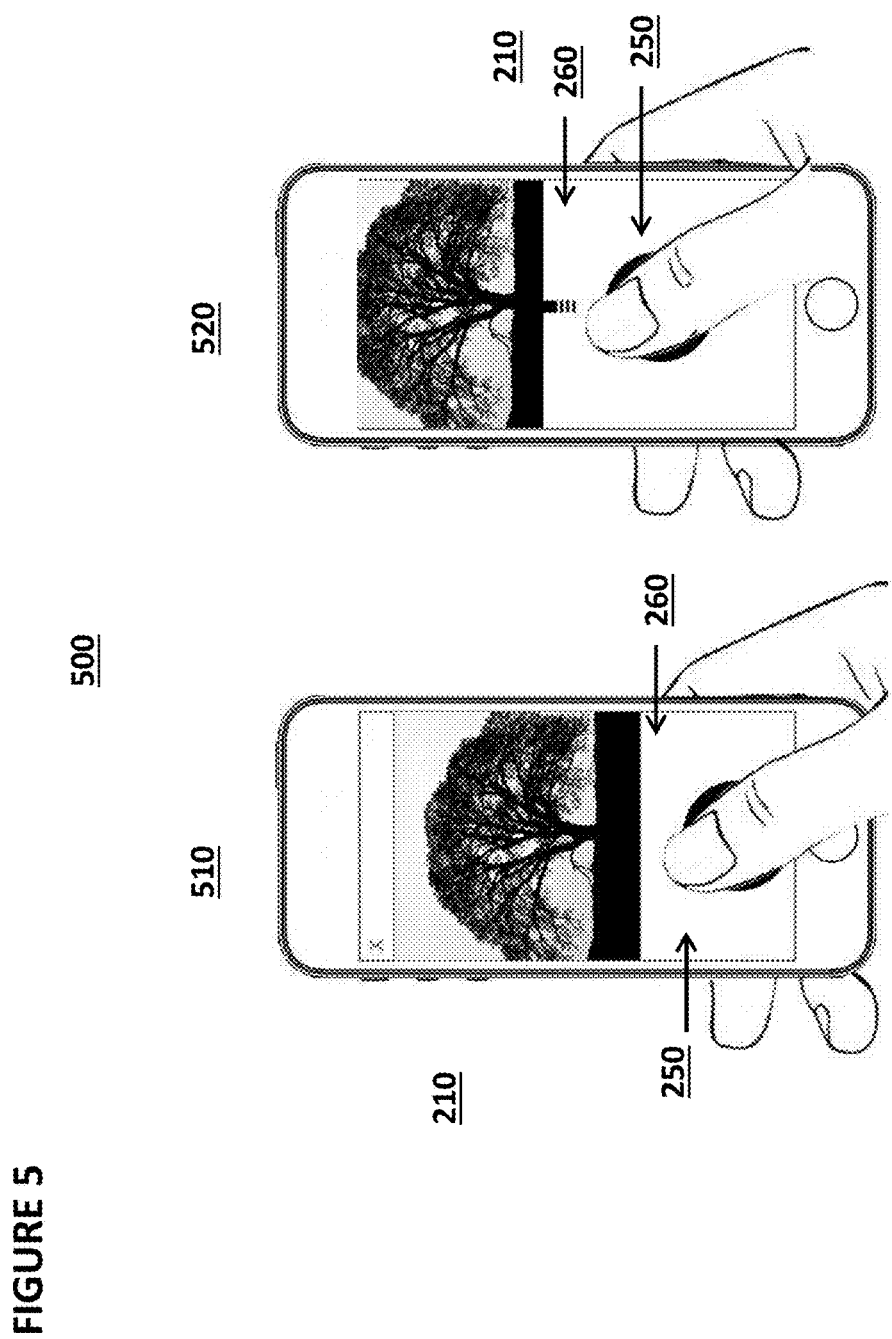
FIG. 5 illustrates a suggested user interface that can be presented to the user when inferring her/his intention to capture the moment.

To elaborate more on the one-click capture and share, an illustrative user interface is presented in FIG. 5. In one embodiment in the invention, and as described in FIG. 4, this interface could be shown on the device to the user when the device infers the user's intention to capture the moment. Through this interface, the user with one action can click on input device 250, and in one move, without moving his thumb off the screen, can throw his thumb up to indicate to the user interface to start sharing the captured moment. Hence the embodiment of the invention in the device starts executing necessary sharing steps for the captured moment. This results in a point-click-and-swipe mechanism (or a speak-click-and swipe mechanism) for capturing and sharing digital content, which is a tremendous improvement over the prior art.

Figure 6:
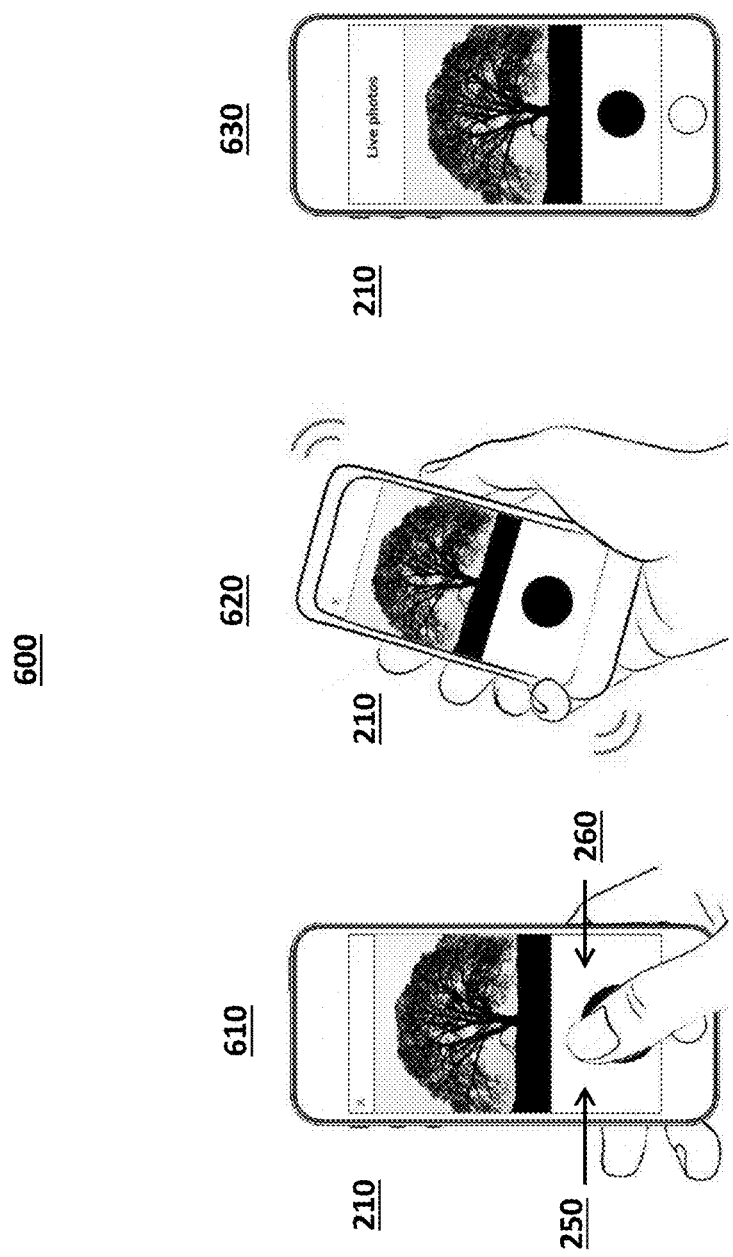
FIG. 6 illustrates capturing and sharing photo seamlessly using the 'click and flick' methodology, in 1 motion.

FIG. 6 shows an illustration of another possible embodiment 600 for capture and share. In this implementation, the methods of the invention in the device infer the user's intention to capture a moment as described above. Hence displaying the one click capture interface shown in part 1 of FIG. 6. When the user clicks and captures the moment (step 610), she/he 'flicks' the device (step 620) instructing the method of the invention on the device to start sharing the captured moment. Software application 830 will interpret the movement of step 620 and will immediately share the digital content through a pre-determined channel (such as by posting it on a web page offered by server 410). So, in minimum and quick interactions with the device, the user is able to perform the capture and share of moments facilitating the easiness of the repetition of such steps with any desired frequency. This results in a point-click-and-flick mechanism (or a speak-click-and-flick mechanism) for capturing and sharing digital content, which is a tremendous improvement over the prior art.

Figure 13:
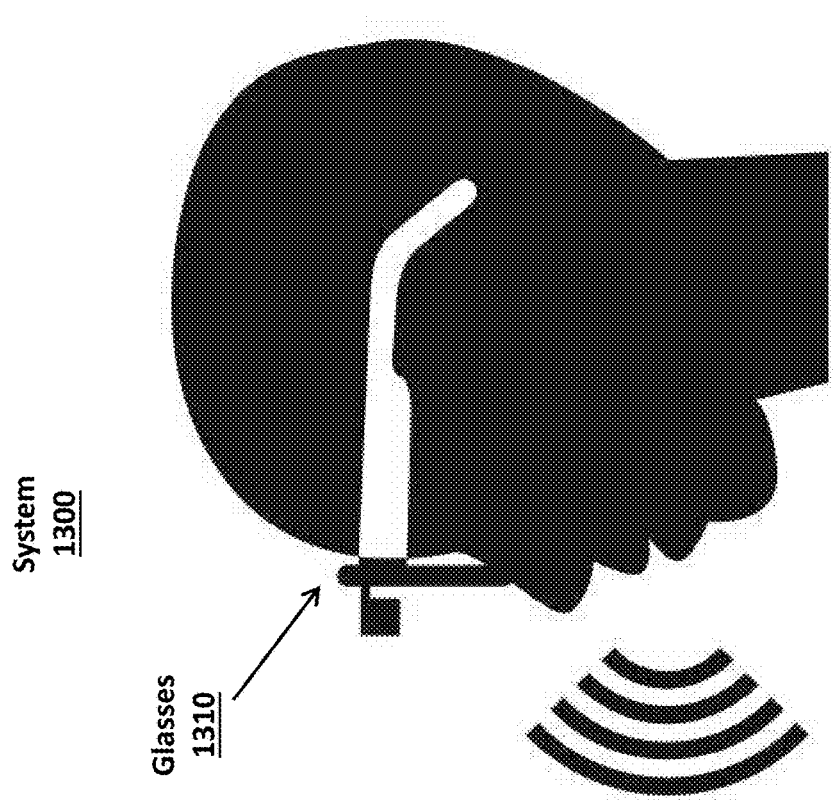
FIG. 13 illustrates an embodiment of the invention implemented in another type of device, here intelligent glasses, that receives and processes a voice command from the user to detect the capture intention.

FIG. 13 shows an illustration of another possible embodiment 1300 for capture and share. In this implementation, a different type of computing device 210, in this case glasses 1310, is used. Here, a user gives a voice command to glasses 1310 (step 310). For example, the user might say "camera" or "photo." Microphone 740 detects the voice command, and software application 830 responds to the voice command by initiating a simple user interface 260 like an icon determining ready to capture mode. In this example, the user might simply say another word to perform capturing, like "capture" or both actions can be done by using the first command only. In another case, the user can blinks with a specified pattern for the capturing to take place. Glasses 1310 optionally could be sun-glasses or normal glasses. In the alternative, computing device 210 instead could comprise another type of eye wearable device, such as contact lenses.

Figure 14:
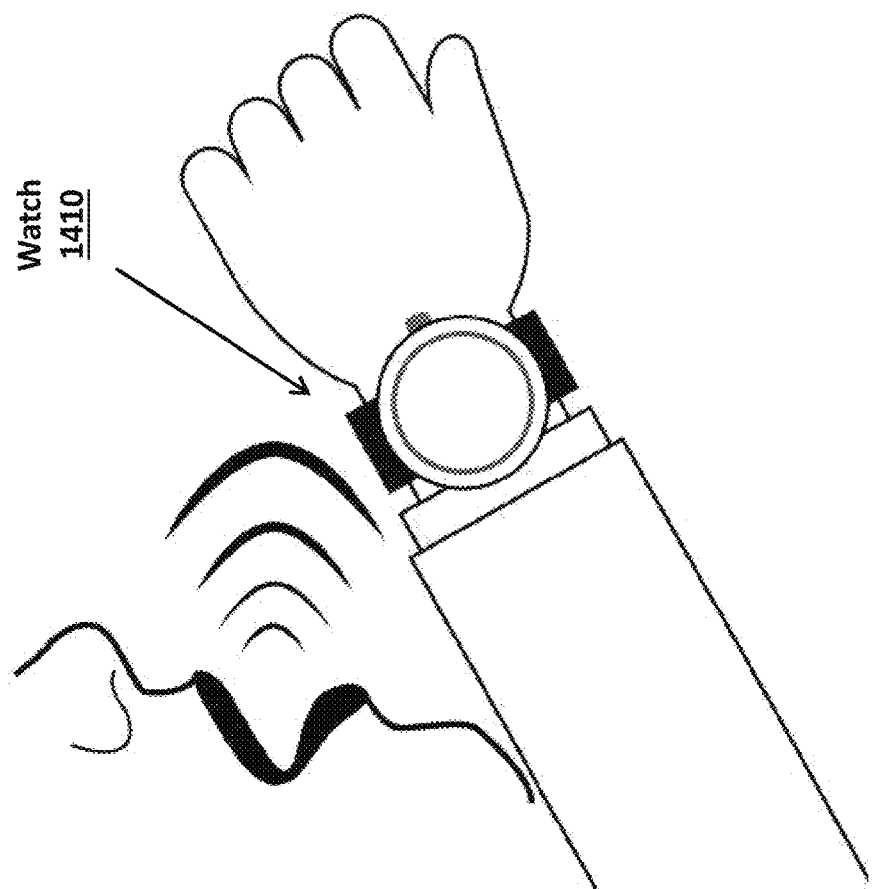
FIG. 14 illustrates an embodiment of the invention showing applicability over different devices and different media types desired to be captured.

FIG. 14 shows an illustration of another possible embodiment 1400 for capture and share. In this implementation, a different type of computing device 210, in this case watch 1410, is used to implement same methods of the invention to capture and share another type of media, in this case voice recordings.

References to the present invention herein are not intended to limit the scope of any claim or claim term, but instead merely make reference to one or more features that may be covered by one or more of the claims. Materials, processes and numerical examples described above are exemplary only, and should not be deemed to limit the claims.

What is claimed is:

1. A system for capturing digital media, comprising:
   a computing device comprising a processing unit, memory, and input device;
   wherein the processing unit is configured by instructions stored in the memory to automatically generate a user interface in response to inference data gathered from a first single user action on the computing device, the user interface configured to allow the user to instruct the computing device to capture digital media using the input device without pressing a button on the computing device; and
   wherein the computing device further comprises a movement detection sensor and the inference data is data from the movement detection sensor indicating the computing device has been moved into a substantially vertical position and wherein the processing unit is configured by instructions stored in the memory to capture digital media in response to a second single user action on the user interface.

2. The system of claim 1, wherein the movement detection sensor is any combination of gyroscope and accelerometer sensors.

3. The system of claim 1, wherein the computing device is a mobile phone.

4. The system of claim 1, wherein the digital media is a digital photo and the input device is a camera.

5. The system of claim 1, wherein the digital media is a video and the input device is a video-enabled camera.

6. The system of claim 1, wherein the digital media is a sound and the input device is a microphone.

7. The system of claim 2, wherein the computing device is a mobile phone.

8. The system of claim 2, wherein the digital media is a digital photo and the input device is a camera.

9. The system of claim 2, wherein the digital media is a video and the input device is a video-enabled camera.

10. The system of claim 2, wherein the digital media is a sound and the input device is a microphone.

11. A system for capturing and sharing digital media, comprising:
    a computing device comprising a processing unit, memory, input device, and network interface;
    wherein the processing unit is configured by instructions stored in the memory to automatically generate a user interface in response to inference data gathered from a first single user action on the computing device, the user interface configured to allow the user to instruct the computing device to capture digital media using the input device without pressing a button on the computing device;

wherein the processing unit is further configured by instructions stored in the memory to share the digital media using the network interface in response to a third single user action; and wherein the computing device further comprises a movement detection sensor and the inference data is data from the movement detection sensor indicating the computing device has been moved into a substantially vertical position, and wherein the processing unit is configured by instructions stored in the memory to capture the digital media in response to the second single user action on the user interface.

12. The system of claim 11, wherein the movement detection sensor is any combination of gyroscope and accelerometer sensors.

13. The system of claim 11, wherein the computing device is a mobile phone.

14. The system of claim 11, wherein the digital media is a digital photo and the input device is a camera.

15. The system of claim 11, wherein the digital media is a video and the input device is a video-enabled camera.

16. The system of claim 11, wherein the digital media is a sound and the input device is a microphone.

17. The system of claim 12, wherein the computing device is a mobile phone.

18. The system of claim 12, wherein the digital media is a digital photo and the input device is a camera.

19. The system of claim 12, wherein the digital media is a video and the input device is a video-enabled camera.

20. The system of claim 12, wherein the digital media is a sound and the input device is a microphone.

21. The system of claim 11, wherein the third single user action is a movement detected by the movement detection sensor.

22. The system of claim 11, wherein the third single user action is flicking the device.

23. The system of claim 11, wherein the processing unit is further configured by instructions stored in the memory to share the digital media in response to the second single user action using the network interface to predetermined categories of recipients and channels based on one or more of location and timing.

24. The system of claim 11, wherein the movement detection sensor is any combination of gyroscope and accelerometer sensors.

* * * * *